Oct. 15, 1946.                    D. GARDNER                    2,409,428
PROCESS OF TREATING IRON ORES CONTAINING CHROMIUM AND RELATED OXIDES
Filed Nov. 14, 1941

EXAMPLE A

ORE COMPOSITION
Metals in Periodic Series 4
Fe & Cr; - e.g. as FeO & $Cr_2O_3$, or $FeO \cdot Cr_2O_3$
Usually Mn; - e.g. $MnO$, or $MnO_2$
Sometimes Co and/or Ni; e.g. as CoO & NiO
Any of above as other oxides, or hydroxides
Frequently oxides other metals, as Al, Ca or Mg
Also other elements; as P, -S, -Si, or oxides
Gangue material

↓

CRUSHED, MIXED OR GROUND WITH:
Basic hydrate, as $Ca(OH)_2$ or $Ba(OH)_2$
Solid reducing agent; as C in form of coke

↓

REDUCTION BY HEAT TREATMENT
In non-oxidizing atmos; - as steam, - or $CH_4$
Temp: above 450°C, below softening point
- below hydrate's loss of water, 525° if $Ca(OH)_2$
with cold water quenching,
$Ca(OH)_2$ in solution

↓

| RECOVERED HEAVIER VALUES | WET SEPARATION, AS BY GRAVITY |
|---|---|
| $Cr(OH)_3$   $Mn(OH)_2$   —   $Co(OH)_2$   $Ni(OH)_2$ <br> —   $Mn_3O_4$   $Fe_3O_4$   — | Removal of gangue and C and basic hydrate and residues of P and S etc. |

↓

MIXING ENRICHED COMPOUNDS
with basic hydrate in C-free mixture

↓

OXIDIZING HEAT TREATMENT
In atmos. of air and superheated steam
Temp: 550°±, range 500-800
Terminate with quenching as before

↓

| $CaCrO_4$   $CaMnO_4$ dissolve out as by water, glycerol alcohol or ether | $Fe_3O_4$   $Co(OH)_2$   $Ni(OH)_2$ unchanged |
|---|---|

| Heat to 190 to 290° | | $Fe_3O_4$ Magnetite | Leach out with Sol $NH_4$ + pref. $NH_4Cl$; dissolves $Co(OH)_2$   $Ni(OH)_2$ |
|---|---|---|---|
| $CaCrO_4$ remains in Sol | $CaMnO_4$ dissociates precipitating $Mn(OH)_2$ | Reduce to metal in known ways | Treat solution with NaOH |

| Precip. by Pb salt as Pb acetate yielding $PbCrO_4$ | Reduce $Mn(OH)_2$ to metal in known ways | | $Co(OH)_2$ remains in solution | $Ni(OH)_2$ precipitates |
|---|---|---|---|---|
| Reduce to $Cr(OH)_3$ and to metal in known ways | | | Extract and reduce metal in known ways | Reduce to metal in known ways |

INVENTOR:
Daniel Gardner
BY
Morrison, Kennedy & Campbell
ATTORNEYS.

UNITED STATES PATENT OFFICE 2,409,428

PROCESS OF TREATING IRON ORES CONTAINING CHROMIUM AND RELATED OXIDES

Daniel Gardner, New York, N. Y., assignor to Virginia Metal Industries, Inc., a corporation of West Virginia Application November 14, 1941, Serial No. 419,222

7 Claims. (Cl. 23—56)

This invention is a novel process of treating iron ores containing chromium and related oxides; and pertains to the recovery from the ores, or other raw materials, of the iron content and as well certain other metallic values, particularly chromium, but also the related metals manganese, cobalt and nickel when present, separately from the gangue and from each other.

This application is related to, and to a certain point may follow, copending application No. 415,890, filed October 21, 1940, patented July 11, 1944, No. 2,353,613, which discloses the beneficiation of iron ores, with the elimination of the gangue therefrom, and takes account of the probable presence in the raw material of one or more of the five related metals chromium, manganese, iron, cobalt and nickel, or rather compounds thereof, especially the oxides; and proposes the recovery of all of these which may be present; which five metals for convenience may be termed the series metals, being the metals of series 4 of the periodic table falling under the higher groups VI and VII and VIII.

The general object of the present invention is to provide an improved process for separating from the iron compounds the compounds of the other metals, and for the separate recovery of each of these, in an industrially practicable manner; so that, with the growing importance of the respective non-ferrous metals, their recovery may have a value to compensate largely or wholly for the process costs, thereby to convert an otherwise unprofitable iron ore to one profitable to be worked, and at the same time affording iron free of the other metals.

A further object is to afford recovery as complete as possible of each of the valuable metals.

Another object is to permit the elimination of the gangue by treatment at such a low temperature that the values are recoverable with minimum difficulty and expense; the process being rather chemical than metallurgical.

A particular object is to afford an improved and more profitable method of separation and recovery of the aforesaid five series metals than that disclosed in said copending application. Other objects and advantages will be explained or appear in the hereinafter described process and the several examples thereof.

The close relationship of the five series metals herein dealt with may be further shown as follows: Their atomic numbers are adjacent, being Nos. 24, 25, 26, 27 and 28. Each metal has valences of 2 and 3, while Cr and Mn have also higher valences, including 6, made use of in this process. All are elements of passive character; that is, the metals can be in the passive state, becoming active only through the catalytic action of hydrogen ions, which is true of very few other metals. Each of the metals is paramagnetic, as are also certain oxides thereof, facilitating magnetic separation. Their industrial oxides are separable by leaching. Their industrial oxides can exist combined in the form of spinels, corresponding to the common spinel, magnesium aluminate $MgO \cdot Al_2O_3$, or to the abstract formula $MO \cdot X_2O_3$, wherein M may be Fe, Ni, Co or Mn and X may be Fe, Cr or Mn; knowledge of which illuminates the structures of certain minerals and indicates the formulas of the ore compounds. As another similarity the five metals can form alums, or double salts of the formula:

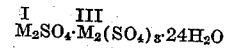
$$\overset{I}{M_2SO_4} \cdot \overset{III}{M_2(SO_4)_3} \cdot 24H_2O$$

Certain portions of the disclosure of the copending application may conveniently be first described because employed or partly followed in the present case. In the raw material or ore the series metals may appear as follows, enumerated in the order of their atomic numbers:

*Chromium.*—Usually as chromic oxide $Cr_2O_3$, or in combination with ferrous oxide FeO as chromite $FeO \cdot Cr_2O_3$.

*Manganese.*—As manganous oxide MnO or other oxide.

*Iron.*—As ferric oxide or hematite $Fe_2O_3$, or as ferrous oxide FeO, or in chromite as stated above.

*Cobalt.*—As cobaltous oxide CoO.

*Nickel.*—As nickelous oxide NiO.

In thus referring to the oxides it is intended to include the corresponding hydroxides $Cr(OH)_3$ and $Mn(OH)_2$ and $Fe(OH)_3$ and $Fe(OH)_2$ and $Co(OH)_2$ and $Ni(OH)_2$, without further mention, as possibly contained in the original ore.

Other elements present, as magnesium, calcium or silicon are automatically eliminated with the gangue; while phosphorus and sulphur compounds may be disposed of with the gangue or in the gases.

In the accompanying drawing is illustrated a flowsheet of one illustrative example or embodiment of the present invention.

In the copending case and preferably herein, the raw material, finely crushed and ground, is intimately mixed with a solid carbon material and a basic hydroxide; or the mixing may precede the grinding. The mixture is then heat-treated, as in a rotary kiln, for a period sufficient to complete the conversions to be effected.

The temperature is to be relatively low for a kiln operation, and is distinctively different from metallurgical smelting temperatures. This low heat avoids softening and agglomeration so that the powdery condition of the mixture is retained; but is preferably above about 450°, to ensure the conversion reactions. The low temperature also minimizes the retention of the ore impurities with the values. The centigrade system is herein used for temperatures.

The carbon, in the form of coke, coal, etc., preferably 1t°c coke, is a solid reducing agent, converting the higher oxides present to lower oxides, e. g. $Fe_2O_3$ to FeO and these combining into $Fe_3O_4$ or magnetite; and similarly with $Mn_2O_3$ and MnO, forming $Mn_3O_4$. The other metal oxides are not necessarily converted, e. g. the chromium may remain as $Cr_2O_3$, or its hydroxide $Cr(OH)_3$.

The basic hydrate is preferably calcium hydroxide $Ca(OH)_2$, although the barium or strontium hydroxide may be employed. Using $Ca(OH)_2$ the kiln temperature should be between about 450° and 525°, the latter being safely below the point at which $Ca(OH)_2$ yields its water of constitution and becomes lime CaO. By using $Ba(OH)_2$ the temperature may be carried up to about 750° if desirable. In the presence of steam the temperature may somewhat exceed the said water yield point. The function of the basic hydroxide is important, as it reacts at the low temperature with any silicon or aluminum compounds present such as silica $SiO_2$ and alumina $Al_2O_3$, and converts the metal silicates and aluminates to oxides, thus to withdraw them from undesirable combination with the iron; also it tends further to promote the reduction reactions. It should be included somewhat in excess as explained in the copending case thus to insure reaction with all silica and alumina present.

The basic hydroxide, e. g. calcium or barium hydroxide, affords important functions in the process. It takes part in converting the troublesome silicates and aluminates to oxides. It engages or absorbs silica, for example as comprised in such compounds as $FeO \cdot SiO_2$. It does all this while operating at a relatively low temperature, below that of softening of the ore, and below that of water-loss from the hydroxide. For example, calcium hydroxide, a basic compound, retains its water of constitution up to about 580° (barium hydroxide to 750°), and the presence of such water component is important to the functioning of the agent, it being found that unslaked lime or calcium oxide CaO will not act similarly. In the presence of the basic or calcium hydroxide, particularly with steam present, and at the low temperatures mentioned, the silica present in any form in the ore tends desirably to enter into combination and to form calcium silicate $CaSiO_3$, which is a compound of light specific gravity and later easily separable from the values of the ore. Moreover when once formed, calcium silicate is a stable compound with a high heat of formation, about 375 cal. The hydroxide thus potentially separates the silica. Similar statements are applicable to alumina in the ore, it becoming converted to calcium aluminate; and corresponding observations apply if calcium hydroxide be replaced by barium or analogous basic hydroxide.

The kiln atmosphere must be non-oxidizing and may be reducing. Steam is a preferred atmosphere, but a volatile hydrocarbon gas may be used, as methane; or other gases as H or CO or $CO_2$. The kiln is of course sealed against air admission.

While still excluding contact with air the kiln discharge is next quenched by abrupt cooling, as in a water bath, preferably having a substantial proportion or saturation of a basic hydroxide or lime hydrate dissolved in it.

The converted mixture contains, besides the gangue materials of lighter specific gravity, the heavier values, the oxides of the series metals, iron, chromium, etc. Notably there will be ferroso-ferric oxide $Fe_3O_4$ and/or its hydroxide, which is soluble in concentrated sulphuric or other acids as acetic, oxalic or tartaric; chromic oxide $Cr_2O_3$ and/or its hydroxide, soluble in excess of caustic soda NaOH solution; manganous oxide MnO or manganosic oxide $Mn_3O_4$ and/or their hydroxides, soluble in ammonium salt solutions; NiO and/or its hydroxide, soluble in ammonium hydroxide; and CoO and/or its hydroxide, soluble in ammonium salts, and in acids, as acetic or tartaric. Now the gangue can be largely removed hydraulically, by gravity separation, being of lighter density and able to be flowed away from the heavier values. There results a converted and enriched mixture ready for further treatments, which, in the copending case comprise selective dissolvings, leachings, precipitatings, washings and dryings, not herein followed and therefore unnecessary to describe; although certain of the steps may usefully be used in a different manner in the present case.

A general characteristic of the copending and present applications may be described as follows. The customary smelting in a blast furnace of the entire contents of the original ore is herein dispensed with, and the gangue portion is preliminarily eliminated, or largely so. This is done at low heat so that the materials need not be softened or fused, and they retain their powdery or crushed condition, ensuring effective reactions and avoiding slagging of the gangue and resulting difficulties. Only the enriched values need go to the smelting stage, and indeed these in separated condition, with the iron compound free of the other metals etc. These advantages are of especial value when the gangue is only of a minor or low proportion of the entire ore.

*Example A*

In its first embodiment or example the present invention commences with the quenched and enriched mix containing the desired oxides of the five series metals, preferably $Cr_2O_3$, and MnO or $Mn_3O_4$, and $Fe_3O_4$ and CoO and NiO; or the corresponding hydroxides. Unless it be desired to have the chromium (and manganese) separate away from the other values, after quenching, as described in Example B, it may be caused to remain with the other values. This is done by the described use of steam and carbon in the kiln reactions, which causes the chromic oxide to take the hydrated form $Cr(OH)_3$ and this stays with the other values $Fe_3O_4$ and $Mn_3O_4$ or $Mn(OH)_2$ and $Co(OH)_2$ and $Ni(OH)_2$ when effecting the preliminary removal of the gangue in the quenching vessel or following separator. After washing the mixture of the values the present invention proceeds as follows.

In a second furnace or kiln are performed second stage reactions at the somewhat higher temperature of about 550°, or within the range 500° to 800°. The enriched mixture of oxides is first mixed with a basic hydroxide or lime hydrate, but the first-stage carbon is omitted. The atmosphere now is to be oxidizing and preferably consists of superheated steam mixed with air. With ample steam in the atmosphere the hydroxide $Ca(OH)_2$ resists loss of its water of constitution to these higher temperatures. These reactions may terminate by cold quenching as before.

By this hot treatment the chromic hydroxide (after losing its water of constitution) is rapidly oxidized and then converted to calcium chromate, while the manganese oxide is similarly converted to calcium manganate, thus:

$$2CaO + Cr_2O_3 + 3O \rightarrow 2CaCrO_4$$
$$CaO + MnO + O_2 \rightarrow CaMnO_4$$

These reactions are selective, since the iron, cobalt and nickel do not undergo corresponding transformation, and the separation out of the chromium and manganese values has thus been begun. As the chromate and manganate (or permanganate) are water-soluble, they may be taken up by the quenching water and thus separated from the other values and gangue.

Now $CaMnO_4$ changes or dissociates at about 190° while $CaCrO_4$ remains stable until about 600°, although its hydrate loses its two molecules of water at about 200°.

By a suitable vehicle and procedure the chromium and manganese can now be mutually separated. An excellent solvent or vehicle is glycerol (glycerine), but alcohol and ether also dissolve calcium chromate and will serve. Assuming glycerol, this boils at about 290°. It may be mixed with the quenching water in which the two salts are dissolved. By heating up gradually this solution, upon passing about 190° at which calcium manganate dissociates, there occurs the precipitation of manganous hydroxide $Mn(OH)_2$, which may be continued to completion, while the chromate alone remains dissolved in the glycerol. Thus these two values are separated out of the five-metal mixture, and separated from each other.

From the glycerol solution of calcium chromate the chromium may be recovered in different ways. One way is to employ a soluble lead salt, for example the acetate, as an agent reactive to precipitate the chromium as $PbCrO_4$, from which the metal is readily obtainable by known methods. For example this salt may be reduced to $Cr(OH)_3$ by distilling off the glycerol, and the hydroxide then can be reduced by ethyl alcohol and then carbon; or by tartaric or hydrochloric acid or sulphuretted hydrogen. The glycerol is not impaired and is recoverable with practically no loss and ready for repeated use.

Another mode of separating from each other the chromium and manganese compounds is as follows. First reduce them to their hydroxides, $Cr(OH)_3$ and $Mn(OH)_2$. Then treat the mixture with NaOH in excess, which acts to dissolve the chromium but not the manganese hydroxide; for which KOH also would serve but is uneconomical.

The three remaining values, after the described removal of the chromium and manganese hydroxides, may be treated as follows. First, leach the three-metal mixture with an ammonia solution, preferably with $NH_4Cl$ added, which dissolves out the cobaltous and nickelous hydroxides $Co(OH)_2$ and $Ni(OH)_2$, leaving the iron compound or magnetite $Fe_3O_4$ isolated. Next, treat the ammonia solution with sodium hydroxide NaOH, which acts to precipitate the nickelous oxide as the hydroxide, leaving the cobaltous hydroxide in the solution; thus completing the desired separations. In some cases magnetic separation steps may be of auxiliary value. The ammonia vehicle is recoverable in gaseous form, available for repeated use. After all the separations are completed conventional metallurgical steps may be employed to convert the separated compound of each metal to the metallic form or to another desired compound or alloy.

The various steps may in most part be performed in continuous process, and the ore may be passed from the crusher to a mixing point and thence by infeed into a furnace chamber with progressive advance, as in a downslanting rotary kiln, which discharges to a quenching vessel with which may be associated conveying, separating and other apparatus elements, as of known descriptions.

Example B

By a simplified process, using but one kiln or furnace, the chromium and manganese values may be conditioned to enter into solution in the quenching water and thus be separated in this way from the iron, cobalt and nickel compounds, as well as from the gangue; and, after the gangue is eliminated the last three metals are separable from each other, as in the manner previously described. This short cut process may proceed as follows.

Into and through the hot reaction chamber or kiln are passed the crushed ore and other agents, for hot treatment and quenching. A basic hydroxide is included in mixture with the ore, but no carbon. To increase thermal conductivity an agent such as calcium chloride is added. To improve porosity of the mix an agent such as brick fragments or powder is preferred, diatomaceous earth, or a hygroscopic clay. The mixed materials may be briquetted before infeed to the kiln.

The atmosphere is preferably of superheated steam mixed with air, and therefore oxidizing. The temperature, which should be indirectly produced, may run between about 500° and 800°. Following a duration of heating sufficient for the reactions the mixture is then quenched.

Since the heating is in the presence of air, followed by quenching, the chromic oxide $Cr_2O_3$ becomes converted to calcium chromate $CaCrO_4$, which may first be without its water of crystallization, but eventually acquire it. Likewise the manganese oxides become the manganate $CaMnO_4$.

These calcium salts, the chromate $$CaCrO_4 \cdot 2H_2O$$

and permanganate $Ca(MnO_4)_2$, being water soluble are rapidly taken up by the quenching bath, and thus separated from the gangue and from the other values. The gangue is thus eliminated. The chromium and manganese oxides, by this process, are restrained from forming spinels or aluminates, and indeed the chromite part of the original ore becomes split in the furnace into the separate oxides of iron and chromium, thus to insure conversion of the latter to chromate and therefore solubility.

The bath water is then treated by suitable agents to recover therefrom the chromium and manganese compounds, while separating these from each other, as in the manner already indicated. In whatever form the other metals remain they may be treated to appropriate separation and conversions.

Further explanations

In one aspect the invention may be summed up as involving the use at an early stage of the basic hydroxide, as Ca(OH)$_2$, to handle the compounds containing silicon or aluminum and so to carry these elements into the gangue, thus enriching the raw material values before smelting; also the use of the same agent to convert certain of the values, chromium and manganese, to soluble salts, but not the others, thus giving easy initial separation of these two, and facilitating complete separation of the respective values from each other before smelting operations. In another aspect the process comprises mixing with the finely divided ore material the basic hydroxide in excess, but no carbon, heating to 500° to 800° in a steam-air atmosphere, thus removing silicon from compounds of the values and oxidizing the values, and also converting the chromium and manganese oxides to chromates and manganates as calcium permanganate which upon quenching may be dissolved out for their separation from the other values.

It should finally be mentioned that vanadium, element No. 23, in series 4, is to some extent or degree amenable to the treatments hereinabove disclosed for elements Nos. 24 to 28. Like the others vanadium has, besides valences 2 and 3, a higher valence, namely, 5. It also is a passive element, as are the others, and as are molybdenum, ruthenium and tungsten, in other series. And it has a similar tendency to oxidize. Moreover its oxide, such as V$_2$O$_5$, is susceptible to conversion to calcium metavanadate Ca(VO$_3$)$_2$, in parallel to the conversion of chromium and manganese, and this product too is water-soluble and thus readily removable from the iron compounds. Therefore in a broad aspect the present invention is applicable to this additional element of the fourth periodic series. Vanadium however rarely appears in the same iron ores with these other series metals; and besides it has very individual characteristics and requires special consideration and steps in adapting the invention to iron ores containing it.

Having thus described examples of a novel process for treating iron ores containing chromium and related oxides, embodying the principles of the present invention, it should be stated that the process so disclosed may be variously modified in regard to the character of the several steps, and their order, the nature of the agents employed, and such matters as temperature and duration, without departing from the principles involved, wherefore it is not intended to limit the invention to the details disclosed except so far as is set forth in the appended claims.

What is claimed is:

1. The process of treating metal oxide mixtures in finely divided form containing iron and chromium oxides for the separate recovery of such iron and chromium values free from the gangue; said process comprising the steps of mixing calcium hydroxide into the finely divided material and subjecting the mixture in a non-oxidizing atmosphere, to an oxidizing temperature above about 500° C. but insufficiently high for substantial loss from the calcium hydroxide of its water of constitution, and for a duration sufficient to ensure the substantial conversion of the iron oxides to Fe$_3$O$_4$ and the chromium oxides to a water soluble calcium chromate; followed by quenching of the mixture in an aqueous vehicle, and causing the converted chromium compound to be dissolved into solution and thus separated from the gangue and the insoluble iron compound.

2. The process as in claim 1 and wherein the chromium compound is thereafter precipitated from solution for reduction to metal form, and the gangue is eliminated from the solids leaving the Fe$_3$O$_4$ in enriched condition for reduction to metal.

3. The process of separating chromium and manganese oxides from a mixture containing also insoluble oxides of iron and of one or more of the series metals of the group consisting of cobalt and nickel, comprising treating the mixture with calcium hydroxide to convert the chromium and manganese constituents only to soluble salts, namely to a calcium chromate and calcium permanganate, and then dissolving out such salts, leaving the other values in solid form; and then heating to above about 190° C. the separated solution of calcium chromate and calcium permanganate thereby to convert the latter and precipitate it as manganese hydroxide.

4. The process of treating metal oxide mixtures in finely divided form containing oxides of iron and of chromium for the separate recovery of such metals or values free from the gangue; said process comprising the steps of mixing calcium hydroxide into the finely divided material, and subjecting the mixture in an oxidizing atmosphere and in the substantial absence of carbon, to a reaction temperature between about 500° C. and 800° C., and for a duration sufficient to ensure the conversion of the chromium oxides present to the soluble calcium chromate; followed by quenching of the mixture in an aqueous bath, and causing the converted chromium values to be dissolved into solution and thus separated from the other values and gangue.

5. The process of treating iron ores containing also oxides of other metals including a chromium oxide, for the separate recovery of such iron and other metals or values substantially free from the gangue; said process comprising the following steps: in a first reaction stage mixing the ore with calcium hydroxide and a solid carbon reducing agent, and in a non-oxidizing atmosphere heating the mixture to a temperature above about 450° C. but below the softening point of the mixture, followed by quenching, whereby the iron content is converted to ferroso-ferric oxide and the chromium to chromic oxide or hydroxide and the other metals similarly to recoverable oxides; and in a second reaction stage mixing with the recovered products of the first stage calcium hydroxide and subjecting the carbon-free mixture in an oxidizing atmosphere, to a reaction temperature between about 500° C. and 800° C., thereby to bring about the conversion of the chromic oxide present to a soluble chromate; followed by quenching of the mixture in an aqueous bath; and causing the converted chromium values to be dissolved into solution and thus separated from the other values and gangue.

6. The process of treating iron ores containing also oxides of other metals including chromium and manganese oxides, for the separate recovery of such iron and other metals or values substantially free from the gangue; said process comprising the following steps: in a first reaction stage mixing the ore with calcium hydroxide and a solid carbon reducing agent, and in a non-oxidizing atmosphere heating the mixture to a temperature above about 450° C. but below the softening point of the mixture, followed by quenching, whereby the iron content is converted to ferroso-ferric oxide and the chromium to chromic oxide or hydroxide and the other metals similarly to recoverable oxides; and in a second reaction stage mixing with the products of the first stage calcium hydroxide, and subjecting the carbon-free mixture in an oxidizing atmosphere, to a reaction temperature between about 500° and 800° C., thereby to bring about the conversion of the chromium and manganese oxides present to a soluble chromate and permanganate respectively; followed by quenching of the mixture in an aqueous bath; and causing the converted chromium and manganese values to be dissolved into solution and thus separated from the other values and gangue.

7. The process of recovering from iron ores containing iron oxides also oxides of other metals including chromium and manganese, of such iron and other metals substantially free from the gangue; said process comprising the following steps: in a first reaction stage mixing the ground ore with $Ca(OH)_2$ and a solid carbon reducing agent, and then in a non-oxidizing atmosphere heating the mixture to a temperature between about 450° C. and the softening point of the mixture, followed by quenching, whereby the iron content is converted to $Fe_3O_4$ and the chromium to $Cr(OH)_3$ and the manganese to $Mn(OH)_2$ or $Mn_3O_4$; and in a second reaction stage, the said products of the first stage being in mixture with $Ca(OH)_2$, subjecting the carbon-free mixture in an oxidizing atmosphere, to a reaction temperature between about 500° C. and 800° C., thereby to bring about the ultimate conversion of such oxides of chromium and manganese present to soluble calcium salts of such metals respectively; followed by quenching of the mixture in an aqueous bath; and causing the converted chromium and manganese values to be dissolved into water solution and thus separated from the other values and gangue; followed by separating the resulting solution of chromium and manganese values and then heating it to a temperature to convert and precipitate the manganese content as insoluble hydroxide, thus separating it from the chromium content.

DANIEL GARDNER.